US006195423B1

United States Patent
Smock et al.

(10) Patent No.: US 6,195,423 B1
(45) Date of Patent: Feb. 27, 2001

(54) TWO LINE VOICE/DATA SWITCH

(75) Inventors: Gary S. Smock, Arvada; Charles E. Copeland, Northglenn, both of CO (US)

(73) Assignee: Command Communications, Inc., Aurora, CO (US)

( * ) Notice: Subject to any disclaimer, the term of this patent is extended or adjusted under 35 U.S.C. 154(b) by 0 days.

(21) Appl. No.: 08/975,507

(22) Filed: Nov. 21, 1997

(51) Int. Cl.[7] ............................................. H04M 1/00
(52) U.S. Cl. ..................... 379/156; 379/164; 379/166
(58) Field of Search ................................ 379/156, 157, 379/161, 162, 163, 164, 165, 166, 335, 336, 343

(56) References Cited

U.S. PATENT DOCUMENTS

| 4,065,642 | 12/1977 | McClure. |
| 4,660,218 | 4/1987 | Hashimoto. |
| 4,821,312 | 4/1989 | Horton et al.. |
| 4,837,797 | 6/1989 | Freeny, Jr.. |
| 5,062,133 | * 10/1991 | Melrose ................................. 379/94 |
| 5,146,489 | 9/1992 | Telibasa. |
| 5,151,972 | 9/1992 | Lorenz et al.. |
| 5,633,917 | * 5/1997 | Rogers ................................... 379/74 |
| 5,768,356 | 11/1998 | McKendry et al. .................. 379/201 |
| 5,832,071 | * 11/1998 | Voelker ................................. 379/165 |
| 5,835,578 | 11/1998 | Reyes et al. ........................ 379/93.29 |

* cited by examiner

Primary Examiner—Curtis A. Kuntz
Assistant Examiner—Binh K. Tieu
(74) Attorney, Agent, or Firm—Pittenger & Smith, PC

(57) ABSTRACT

A multi-line telephone switch device wherein relays added to a routing switch automatically route incoming calls on a plurality of lines to predetermined devices based upon the distinctive rings or tones present on the lines. A number of relays can be added to the routing switch. A line select relay connects the routing switch device to a specific incoming line. A bypass relay allows the device to connect a line directly to an extension by bypassing the routing switch. An invert relay enables the invention to reverse the designation and the routing priority of the incoming telephone lines. Ring detectors detect incoming rings and output a signal to a processor which then directs the switch configurations. Additionally, the system enables a single line telephone answering device to answer and record messages from a multitude of incoming lines. The multi-line telephone switch can uniquely route calls based upon the distinctive ring cadence on each of the lines. In addition, a switch overrides distinctive ring routing upon the detection of DTMF tones.

11 Claims, 4 Drawing Sheets

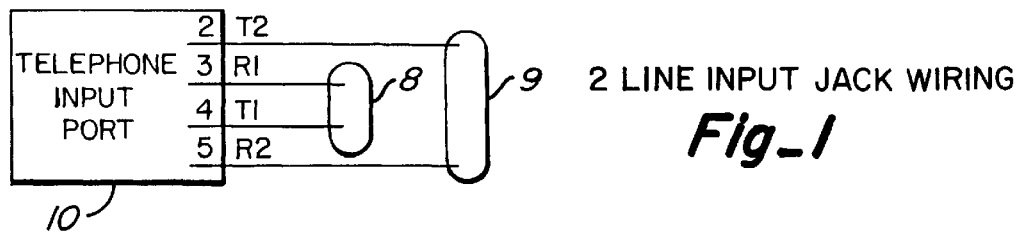
2 LINE INPUT JACK WIRING
Fig_1
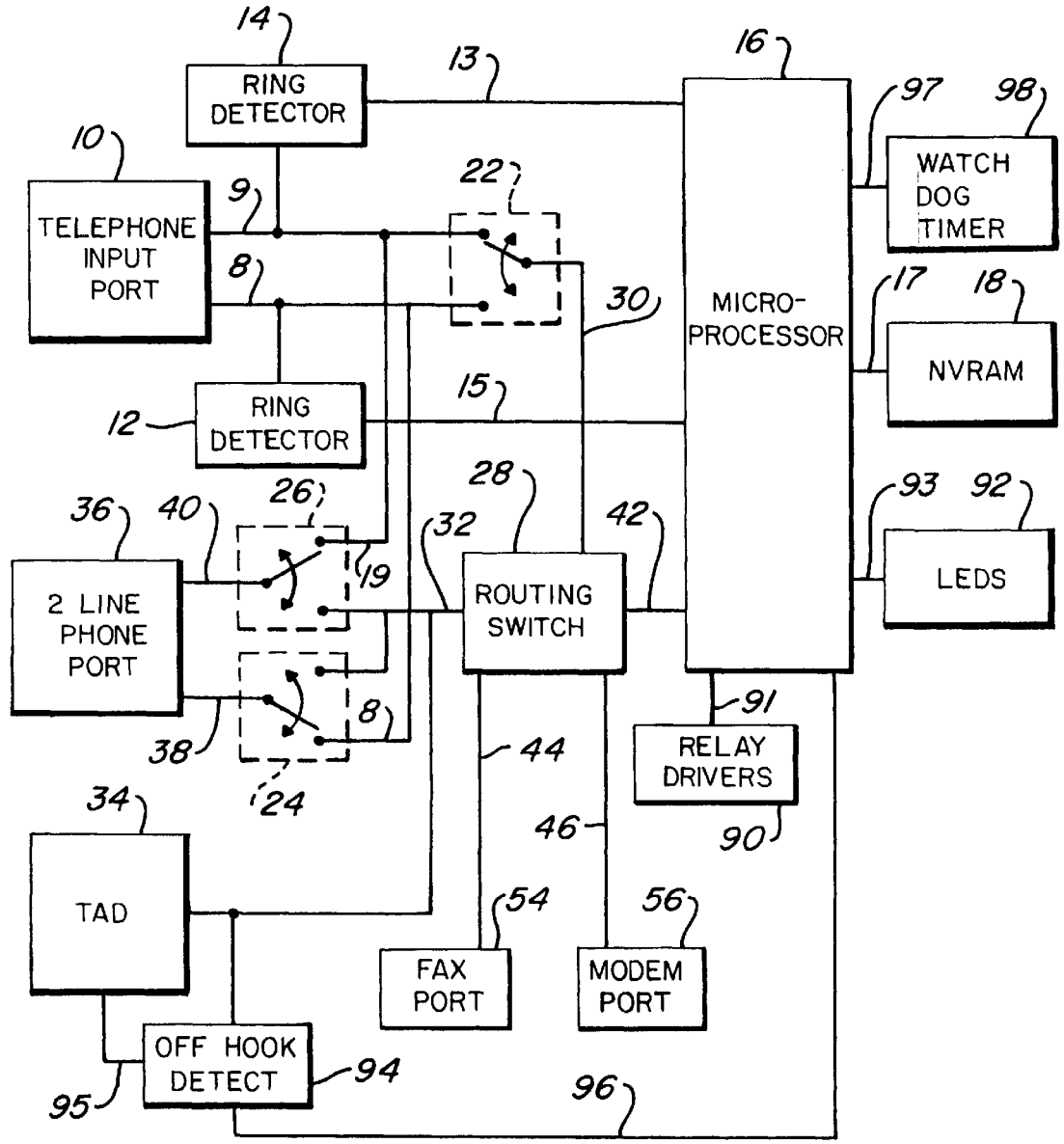
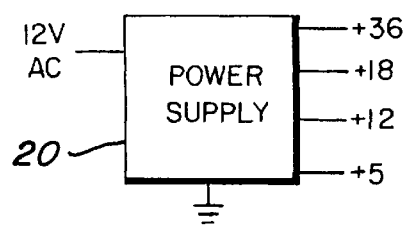
Fig_2

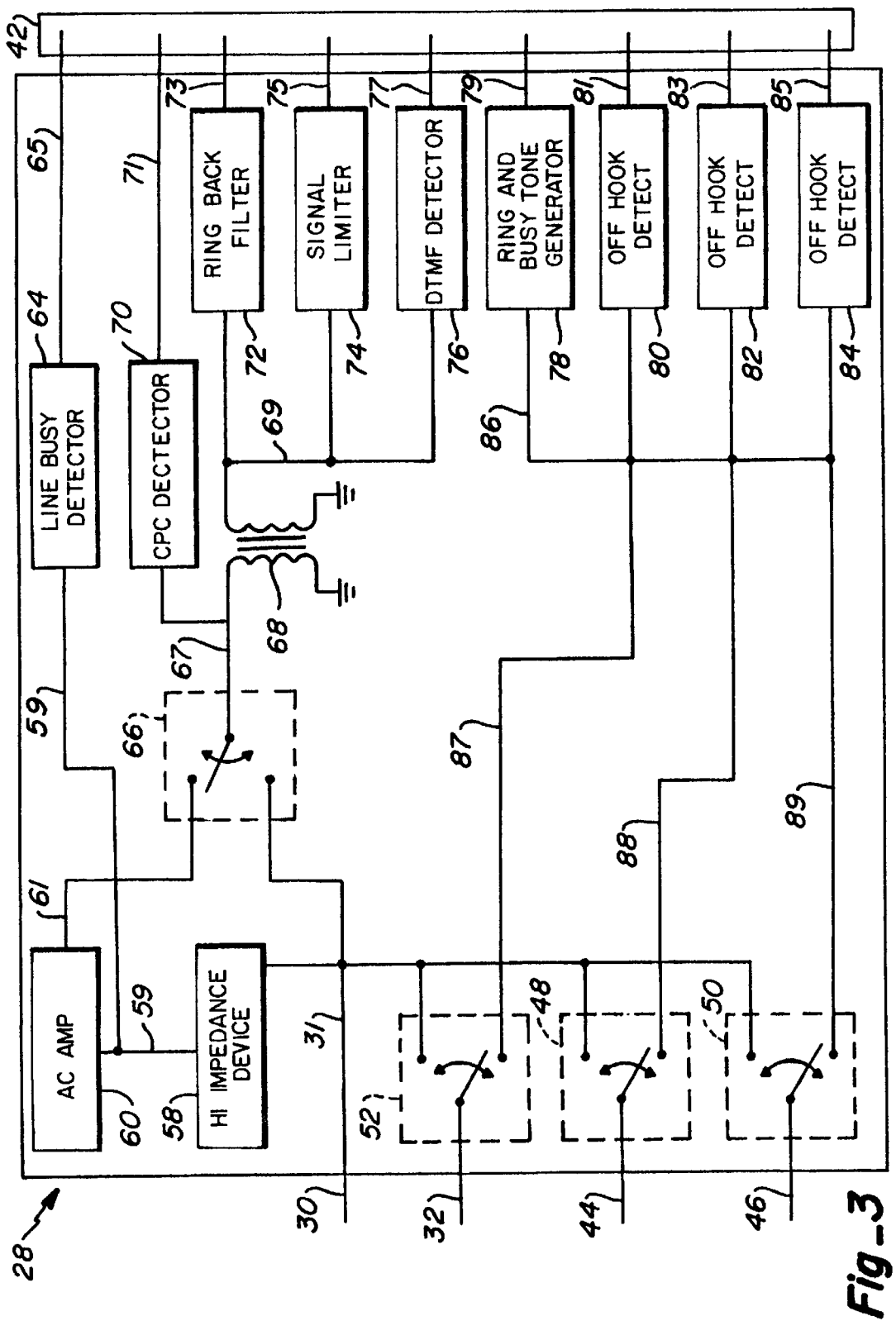
Fig_3

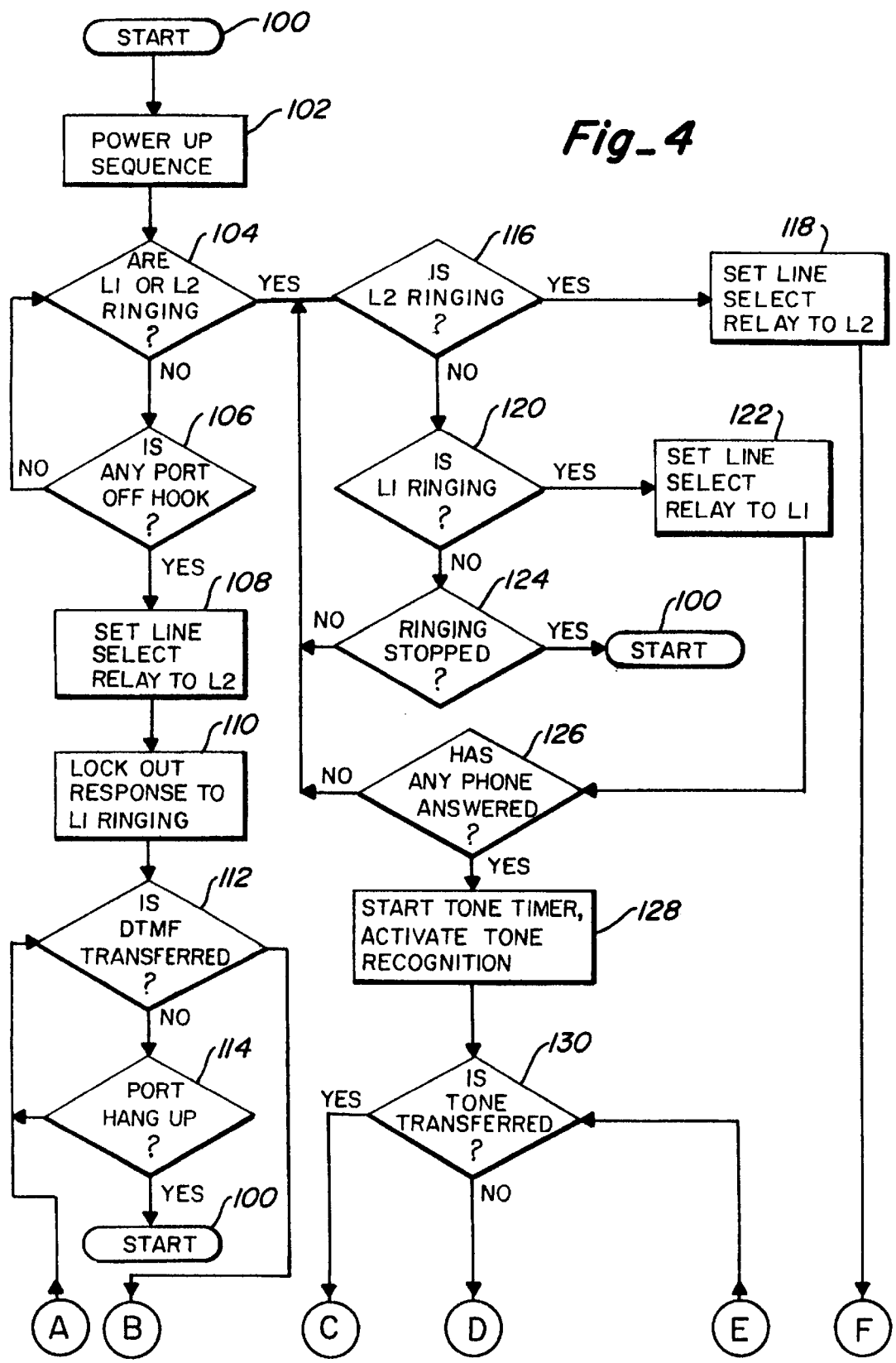

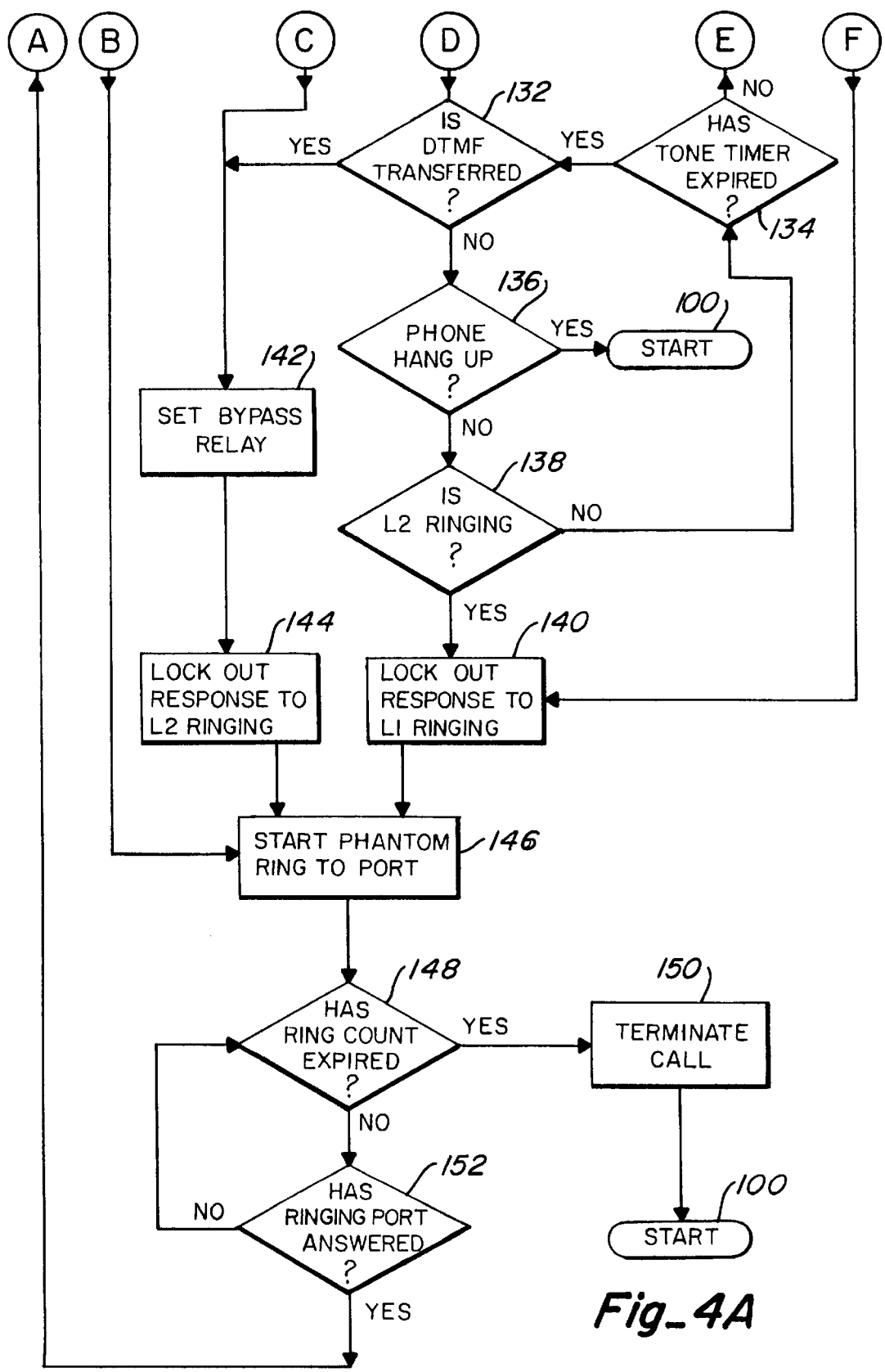
Fig_4A

TWO LINE VOICE/DATA SWITCH

FIELD OF THE INVENTION

This invention is directed to a device connected to a multi-line incoming telephone line to automatically detect which line is ringing and automatically route incoming calls to a plurality of outlet ports and connected voice and data devices.

BACKGROUND OF THE INVENTION

Over the years, the telephone system in this country has been primarily used for voice communications. Within recent years, however, the same telephone system has also been used for the transmission of data with ever increasing success. These data transmissions have been substantially in the form of facsimile transmissions through the use of modern day facsimile machine technology. At the same time, data has also been transmitted by means of more versatile personal computers through the use of modems having increased transmission speeds. The modem has allowed businesses as well as the private sector to be connected together for the transfer and exchange of data and information either from fixed locations or portable work stations.

While each of these devices provide means for the transmission of data, they usually require individual or dedicated telephone lines in order to perform these services. More recently, automatic voice/data switches which can sequentially carry voice and data transmissions have been devised which allow a single telephone line to be connected to a multitude of telecommunications devices. These switches enable a single telephone line to carry at various times voice conversations, facsimile transmissions, and data transmissions via modems.

With the automatic voice/data switches which are presently available, a telephone answering device (TAD) can be connected to the switch so it will directly answer the telephone line if the incoming telephone call is not promptly answered. At the same time, individual or multiple frequency tone signals such as discrete codes, and calling (CNG) tones transmitted on the incoming telephone line can be automatically switched by these devices so as to connect the incoming call with the desired telecommunications device. Thus, a CNG signal transmitted on the calling line by a calling fax machine can be automatically connected by a switch to a fax machine. By the same token, a DTMF or discrete coded signal can be manually applied to the telephone line to command the switching device to make the desired connection.

Faced with increased usage of single telephone lines, and the resulting tying up of the telephone line, many locations have opted for multi-line telephone lines. The multi-line telephones may utilize distinctive rings to identify which line is being called. The currently available automatic voice/data switches do not provide for data routing on multi-line telephone lines. As a result, one of the objects of the present invention is to provide a voice/data switch so that data incoming upon multiple telephone lines can be routed to desired devices or locations.

INFORMATION DISCLOSURE STATEMENT

This information is provided in response to the applicant's acknowledged duty to inform the Patent and Trademark Office of all materials pertinent to the examination of this application of which the applicant is aware. This presentation is not to be construed as an acknowledgment that the applicant has performed a search of the prior art in the area of this invention.

The McClure patent (U.S. Pat. No. 4,065,642) is the applicant's prior patent and is directed to a telephone signaling and paging device which strictly senses the presence of an incoming voice message on an attached telephone answering device. A signal is sensed coming from the answering machine which indicates that a message is present and the system in turn goes to an off-hook condition and dials a prerecorded telephone number for paging or informing the user that a voice message has been received. This system does not in any way show or teach the sensing of the reception of various types of calls on a single or multi-line telephone line, including data to any one of a number of devices attached to a voice/data switch or telephone terminal device.

The Lorenz, et al patent (U.S. Pat. No. 5,151,972) discloses a device for automatically connecting a terminal to a telephone line. The device includes means for monitoring a telephone line upon detection of a ring signal. The system monitors the telephone line for either a DTMF or CNG signal. Upon detection of either signal, an incoming call is routed to one of a series of connected devices, such as a facsimile machine or a computer modem. This patent does not disclose a device for automatically connecting a terminal to a multi-line telephone line using distinctive rings to identify the telephone line upon which an incoming call is received.

The Telibasa patent (U.S. Pat. No. 5,146,489) discloses an electronic device for controlling the flow of data between a single incoming telephone line and a fax modem or voice calls to a telephone. This device includes a means for disconnecting the normally connected fax machine from the telephone line and includes means for detection of a predetermined signal or code within a certain time period, indicating that the incoming call is a fax call. The fax machine is reconnected and initiated. If the required code or signal is not received, it is assumed that the incoming call is a voice call and the call is directed to a telephone or a telephone answering device. This device does not automatically route incoming calls on a multi-line telephone line to a desired device or location.

The Horton, et al patent (U.S. Pat. No. 4,821,312) discloses a voice/data switch and is used for selectively connecting an audio terminal device, such as a telephone or an electronic data device such as a facsimile machine. The switch includes an announcement device providing an outgoing message upon receipt of a ring signal. The message requests that a certain return signal be provided to directly connect the switch to the voice or audio communication terminal device or to the facsimile device. Selective switching is provided in response to the returned signal. As such this patent does not disclose a switch for routing incoming signals on a multi-line telephone line.

The Freeny patent (U.S. Pat. No. 4,837,797) discloses a device which automatically switches an incoming call to a plurality of telecommunication devices based upon the presence of voice or non-voice data. This invention automatically answers the incoming telephone call and upon detecting voice data the invention rings a telephone extension to signal to an operator the presence of the incoming call. If upon answering the incoming call, non-voice data is present this invention will route the incoming call to a plurality of telecommunication devices including computer interfaces, message receivers, etc. Thus, this patent performs the functions of switching an incoming call to a telecommunications device. Unlike the invention to which this application pertains, the Freeny patent neither provides for nor envisions the switching of multiple incoming telephone lines to a plurality of telecommunications device.

The Hashimoto patent (U.S. Pat. No. 4,660,218) discloses another method of switching an incoming telephone call to either a telephone extension or a telecommunications device based upon the absence or presence of a control signal. This patent provides for the connection and switching of a single telephone line to a single telecommunications device. As such this patent neither discloses nor envisions the switching of multiple incoming telephone lines to a plurality of telecommunication devices to which the present herein disclosed invention pertains.

SUMMARY OF THE INVENTION

A multi-line telephone line data routing switch is disclosed which automatically routes an incoming signal on a multitude of telephone lines to a plurality of telecommunications devices or locations. It is well known in the art to provide automatic switching devices for connection to a single telephone line to automatically switch or branch the telephone line to a plurality of telecommunication devices such as a telephone, TAD, facsimile machine, computer modem, etc. In this way a single telephone line can be used for a number of different functions rather than having individual dedicated telephone lines for each function.

The present invention provides a device which allows connection of an incoming signal on a multi-line telephone port to a plurality of telecommunication devices. Thus, more than one telephone line can be easily and inexpensively switched and connected to a plurality of telecommunication devices through the disclosed invention.

Incoming telephone signals for each incoming telephone line are routed to specific ports based upon the recognition of distinctive rings provided by the telephone company's Distinctive Ring Service (DRS). Thus, telecommunication devices can be directly connected to incoming telephone lines by a caller dialing a predetermined number, the telephone service provider initiating a distinctive ring for the number, and the invention recognizing the DRS and connecting the incoming telephone line to the predetermined outlet port and the connected telecommunications device. For example, the invention could be configured such that an incoming call with a DRS type 1 would automatically be connected to a facsimile device.

The switch can, also, be configured to route incoming telephone calls based upon the presence of distinctive tones. The invention can detect a facsimile CNG tone (1100 Hz) upon the incoming telephone lines and connect the incoming line to the facsimile device. Similarly, the invention will automatically route regular (non-data) incoming telephone lines to a telephone answering device and/or telephone extension.

Additionally, the invention provides the capability of utilizing a single Telephone Answering Device (TAD) to answer both lines on a two line telephone extension. The invention can be programmed such that a designated line will receive priority processing over other telephone lines, and fully programmable features allow the operator to select the operation modes of the invention.

It is an object of the present invention to provide a multi-line telephone switch which automatically connects an incoming telephone line with a desired telecommunications device in response to the presence of a distinctive ring or tones upon the incoming telephone line.

It is another object of this invention to provide a programmable telecommunications switch which will connect an incoming signal possessing a distinctive ring on a first telephone line to a first device while connecting a second telephone line to a different device based upon an incoming signal incorporating the same distinctive ring as that which was received on the first telephone line.

It is a still further object of this invention to provide a telephone switch which can be programmed such that a designated device receives telecommunication signals of a predetermined format.

BRIEF DESCRIPTION OF THE DRAWINGS

The present invention will be better understood by reference to the following detailed description of the preferred embodiment of the invention when taken in conjunction with the drawings herein:

FIG. 1 is a diagram of a 2-line telephone jack illustrating the wire numbering convention used throughout this application;

FIG. 2 is a block diagram of a telephone switch according to the present invention which illustrates the preferred embodiment of this invention;

FIG. 3 is a block diagram of a routing switch according to the present invention; and FIG. 4 is a logic diagram showing the sequence of operation of the switching function of the present invention.

DETAILED DESCRIPTION OF THE INVENTION

Turning now more specifically to the drawings, FIG. 1 shows the wiring of the 2 line telephone input port 10. Four telephone wires 2, 3, 4 and 5 are provided for any two line telephone jack. Two wires are needed to complete a telecommunications circuit. Wires 3 and 4 are combined as an inner pair (R1 and T1) and wires 2 and 5 are combined as an outer pair (T2 and R2). Hereafter, the inner pair and outer pair shall be respectively referred to as line one 8 and line two 9, as shown in FIG. 1. For purpose of this description only, the location would utilize line one 8 primarily for voice communications and line two 9 primarily for data via fax/modem. Line one could also be used for fax/modems and line two could also be used for roll-over voice communications when line one is busy and a second incoming voice call is rolled over to line two by the telephone service provider.

FIG. 2 shows line one 8 and line two 9 connected to an incoming telephone line by the telephone input port 10. A ring detector is connected to each line. Ring detector 12 detects calls and distinctive rings upon line one 8, while ring detector 14 detects calls and distinctive rings upon line two 9. The line two ring detector 14 and line one ring detector 12 are connected by leads 13 and 15, respectively, to a processor 16. The processor stores and retrieves information from non-volatile random access memory (NVRAM) 18. Lead 17 connects the processor 16 to the NVRAM 18. A power supply 20 provides power to the system in required voltage increments to power the components of the system.

Lines 8 and 9 are each connected to a pole of the line select relay 22. Line one 8 is connected to a pole of the invert relay 24, and line two 9 is connected to a pole of the bypass relay 26. Also, connected to the line select relay 22 is lead 30 which provides the input to the routing switch 28. The routing switch 28 is illustrated in detail in FIG. 3. Connecting the routing switch 28 to the TAD port 34 is the TAD lead 32. The TAD lead 32 is also connected in common to both the invert relay 24 and the bypass relay 26. Sensing signals on the TAD lead 32 is the TAD off hook detector 94 which also directly senses the operating state of the TAD port 34 via lead 95. The TAD off hook detector 94 provides a signal to the processor 16 via lead 96. Additionally, the TAD lead 32 receives telephone signals from the routing switch 28 for routing to the TAD port 34, and depending upon the positions of the invert relay 24 and the bypass relay 26 to either the first line 38 or second line 40 at the 2-line phone outlet port 36. The outlet port 36 can be a multi-line telephone port depending upon how many inlet telephone lines and relays are provided in the voice/data switch.

Lead 44 connects the routing switch 28 to the fax port 54, and lead 46 connects the routing switch 28 to the modem port 56. Also, shown are the relay drivers 90 and lead 91 which connects the relay drivers 90 with the processor 16. Light Emitting Diode (LED) 92 provides status information of the system and is connected to the processor 16 by lead 93.

A watch dog timer 98 is provided and connected to the processor 16 by lead 97. The watch dog timer 98 monitors the operation of the processor 16 and ensures it does not get "hung-up" on a process. Should the processor 16 get "hung up" the watch dog timer 98 will not receive a reset message from the processor 16 within the designated time period. The watch dog timer 98 will then reset the processor 16 thereby alleviating the "hang up".

The routing switch 28 is controlled by the processor 16 via lead 42. As shown in FIG. 3, lead 42 is a representation of the multitude of leads (65, 71, 73, 75, 77, 79, 81, 83, and 85) connecting the processor to the individual components within the routing switch 28. The telephone signal enters the routing switch 28 via lead 30. Lead 30 connects to internal wiring 31 within the routing switch 28. Via the internal wiring 31 the telephone signal is routed through a high impedance device 58 which prevents the telephone line from being loaded. The reduced telephone signal on lead 59 is sent to a line busy detector 64. The line busy detector 64 detects whether an extension of the selected telephone line is busy or in use. The line busy detector 64 is connected to the processor 16 by lead 65. The reduced telephone signal on lead 59 is also sent to AC amplifier where it is amplified. The amplified signal is then connected to the off hook relay 66 via lead 61. The off hook relay 66 is connected via lead 67 to matching transformer 68. The off hook relay 66 normally connects the transformer 68 to the signal on lead 61. The off hook relay 66 when energized connects the incoming call directly to the transformer 68. Thus, the transformer 68 is connected via the off hook relay 66 to the incoming telephone signal on lead 31. The transformer 68 adjusts the power of the signals received and those to be transmitted back over the telephone line via lead 31. The off hook relay 66 is normally positioned so that lead 67 is connected to lead 61. This allows the system to detect and process telephone signals without loading the telephone line.

Lead 67 provides signal connectivity to both the transformer 68 and the Calling Party Control (CPC) detector 70. The CPC detector 70 is connected to the processor 16 via lead 71. The CPC detector 70 detects the changes in the frequency upon the telephone line when an extension is hung up at either the originating or remote end. The CPC detector 70 prevents the telephone line from being needlessly tied up after a call has been discontinued. The transformer 68 is connected via lead 69 to the ring back filter 72, signal limiter 74, and DTMF detector 76. Each of these components are connected to the processor 16 by leads 73, 75, and 77 respectively.

Additionally, within the routing switch 28, lead 31 provides telephone signal connectivity to three relays: fax select relay 48; modem select relay 50; and, TAD/phone select relay 52. The other pole of the TAD/phone select relay 52 is connected via lead 87 to the phone off hook detector 80 which is connected to the processor 16 by lead 81. The other pole of the fax select relay 48 is connected via lead 88 to the fax off hook detector 82 which is connected to the processor 16 by lead 83. The other pole of the modem select relay 50 is connected via lead 89 to the modem off hook detector 84 which is connected to the processor 16 by lead 85. Also, lead 86 connects leads 87, 88, and 89 to the Ring Generator and Busy Tone Generator (CRG/BTG) 78; which is connected to the processor by lead 79.

The invention is fully programmable. It can be programmed for locations with only one incoming telephone line or with two incoming telephone lines. Additionally, at locations with two incoming telephone lines, the invention can be configured to route calls on both lines or on one of the two lines, the operator having designated which line for the switch to route while ignoring the other line. For example, if a location has two incoming lines A and B, the invention can be configured to route calls on A while ignoring B, or B while ignoring A, or to route calls on both A and B. However, when two lines are being routed by the invention, the operator must designate one line as the priority line. Thus, either line A or line B would have priority.

The invention can be programmed into three modes of operation: active, passive, and passive monitor. These modes are programmable and determine which features are available. In one line operation, the invention can be configured into either active or passive mode. For two line operation, one line can be configured in active/passive mode, while the other line must be configured in passive monitor mode. At no time can both lines be configured in active/passive mode. For two line operations, one line must always be configured in passive monitor mode. The operator designates which line, line one 8 or line two 9, is in active/passive mode, hereafter the priority line. The other line is configured in passive monitor mode and is the non-priority line.

In active mode, no port (including telephone extensions) will ring when the line is called. Instead, the invention actively answers the incoming call upon the selected line. Assume line two 9 is the priority line and has been configured in active mode. The bypass relay 26 would be switched such that lead 40 is connected via the bypass relay 26 to lead 32. Similarly, if line one 8 was the priority line and configured in active mode (while line two was in passive monitor mode), the invert relay 24 would be switched so as to connect lead 38 to lead 32 and thereby prevent the 2-line phone port 36 from being directly connected to incoming line one 8.

Assume line two 9 is the priority line and has been configured in active mode. The ring detector 14 detects ring signals upon line two 9. Each ring is processed by the ring detector 14 and sent to the processor 16. After a programmable number of rings have been received by the processor 16, the incoming call is automatically answered by the invention. The processor 16 configures the line select relay 22 such that line two 9 is connected to the routing switch 28 via lead 30. Upon answering, relay 66 is activated to its second position (it is normally in the first position) and connects the telephone signal to the transformer 68 and CPC detector 70. From the transformer 68 the telephone signal is sent to the signal limiter 74 and the DTMF detector 76. The signal limiter 74 squares up the signal such that the processor 16 can detect fax CNG tones (1100 Hz), reverse modem tones (2200 Hz), and modem tones (1300 Hz) while the DTMF detector 76 and processor listen for four seconds for the presence of CNG or DTMF tones.

If no tones are detected, the processor 16 configures the CRG/BTG 78 to generate ring signals while configuring the TAD/phone select relay 52 such that the TAD lead 32 is connected to the RG/BTG 78 via lead 87. Also, the invention initiates pseudo or phantom ring backs to the incoming caller such that the caller is unaware the invention has answered. For pseudo ring back to occur, the processor 16 configures relay 66 such that lead 31 is connected to lead 67 and directs the ring back filter 72 to generate the distinctive ring type detected by the ring detector 14.

The invention rings the TAD port 34 and 2-line phone port 36 for a predetermined programmable number of rings. If the call is not answered, it is then forwarded to the fax port 54. The fax port 54 is rung for a programmable predetermined number of rings. If the fax does not answer in the allotted number of rings, the call is terminated.

If a tone is detected, the processor 16 terminates ringing on the phone port 36 and the TAD port 34 via lead 32. If the processor 16 detects fax tones, the fax port 54 is rung via lead 44. If the tones are reverse modem or modem tones, the modem port 56 is rung via lead 46. The selected port is rung for a programmable predetermined number of rings, after which the invention terminates the call. If the selected port answers, the off hook detector (82 for the fax, or 84 for the modem) sends a signal to the processor 16 which connects the appropriate device selection relay (fax select relay 48, or the modem select relay 50) via the internal wiring 31 and lead 30 to the line selected by the line select relay 22. In this example, if a fax tone was received and the fax answered the call it would be connected to line two 9 through the line select relay 22 via lead 30 and internal wiring 31 to the fax select relay 48 via lead 44 to the fax port 54. Additionally, once a port answers, phantom ring back is terminated, relay 66 returns to its normal position and the calling party may transfer the call to another port by using pulse dialing or DTMF entry.

The second mode is the passive mode. When configured for passive mode the invention is configured to route calls directly to the phone and TAD ports without actively answering the call. Continuing our example with line two 9 being the priority line configured in passive mode, the bypass relay 26 would be switched so as to connect the 2-line phone port 36 via lead 40 to line two 9. Additionally, the line select relay 22 would be configured such that line two 9 is connected to the routing switch 28 via lead 30. Additionally, the routing switch 28 is configured such that lead 31 is connected via the TAD/phone select relay 52 and lead 32 to the TAD port 34. The invention in this mode never answers a call but counts the number of rings sensed by the ring detector 14. If the phone or TAD answers, the invention listens for CNG tones for a programmable predetermined time period and will transfer the call accordingly. The caller may then transfer the call to another port using pulse dial or DTMF entry.

Upon the detection of a predetermined programmable number of rings on the priority line, the routine switch 28 transfers the incoming call to the fax port 54 while disconnecting the TAD/phone select relay 52 from lead 31 and disconnecting the bypass relay 26 from line two 9. The fax port 54 will then ring indefinitely until the call is answered or the circuit detects that ringing has stopped. If inbound ringing stops, relays are reset such that the 2-line phone port 36 and TAD port 34 are the only ports connected to the priority line.

In two line configuration, the non-priority line must be configured in passive monitor mode. This mode is very similar to passive mode. However, the non-priority line should be thought of as a straight through wire pair to the phone port. In our example, line one 8 is the non-priority line. Line one 8 is connected through the invert relay 24 and lead 38 directly to the 2-line phone port 36. The invert relay 24 is normally configured in this position. Only the phone shall ring in response to ringing on the non-priority line. Once the incoming call is answered on the non-priority line, if the priority line is not currently connected to an incoming call, the line select relay 22 will switch and will connect the non-priority line one 8 to the routing switch 28. The invention then listens for tone and DTMF transfer codes.

The non-priority line can also be configured such that incoming calls will be routed to the TAD. This feature, TAD Ring Activation (TADRA), enables the connection of a single line TAD to two incoming telephone lines. This configuration is normally used in unattended operations (when nobody is present to answer incoming telephone calls). When TADRA is enabled and a call is not being processed by the priority line (line two 9), the non-priority line one 8 is connected upon detection of incoming ring signals by the ring detector 12 to the routing switch 28 via the line select relay 22. Within the routing switch 28, the TAD/phone select relay 52 is switched and connected to lead 31, thereby connecting the incoming call to lead 32 and the TAD port 34. In attended operations, TADRA should be configured off so that inbound calls (usually faxes) on line two 9 have priority over voice calls on line one 8. Thus, TADRA facilitates connecting a one-line TAD to two telephone lines.

A third way to route telephone calls is via Distinctive Ring Service (DRS). Each line can be configured to respond to DRS. Under DRS each device is assigned a particular ring pattern (for example, voice=1 ring, fax=2 rings, modem=3 rings, etc.). Normally, only the priority line should be configured for DRS. If DRS is configured for the non-priority line, the priority line will not override incoming calls on the non-priority line. Thus, with DRS enabled on the non-priority line, a voice call on the non-priority line would be routed by the device while an incoming fax call on the priority line would not. The circuit will be tied-up processing the DRS non-priority call and will not be able to route the priority fax to the fax port. Thus, DRS should normally be enabled only on the priority line. When DRS is enabled, single tones (CNG, reverse modem, modem and DTMF) will override DRS routing.

The novel multi-line switch device as currently depicted can only connect one line at a time through the routing switch while the other line is directly connected to the corresponding phone line connection at the 2-line phone port 36. With the addition of a plurality of routing switches, the present invention can be modified so as to connect any line at any time to any available telecommunications device. It appears that nine routing switches is an ideal number for a completely automated switch device.

For the present embodiment, the priority scheme determines which line is routed by the switch. Continuing with line two 9 being the priority line, it may be configured in either the active or passive mode. In this configuration, line two 9 has priority (i.e. the switch would process line two incoming calls before processing line one incoming calls)

whenever line one 8 is in an idle state. Thus, if neither line one 8 or line two 9 were currently connected and an incoming call arrived simultaneously on both lines, the present invention will monitor the call on line two 9 while disabling monitoring of line one 8.

Similarly, if a call on line one 8 had been answered and a call was incoming on line two 9, the switch would disable the monitoring of the call on line one 8 and would monitor the call on the priority line, line two 9. Line one 8 has priority when the call on line one 8 contains tones, DRS, or DTMF. The presence of tones, etc. require routing by the routing switch 28. Thus, the line one 8 call is not bumped by a subsequent call on line two 9. Once tones are detected on line one 8, line two 9 is placed in bypass mode. Bypass mode effectively wires line two 9 around the routing switch 28 by connecting lead 40 to line two 9 by switching the bypass relay 26. The line busy detector 64 notifies the processor 16 whenever the routing switch 28 is routing an incoming call to a device port. The invention remains in bypass mode until the incoming calls on both lines are terminated.

The other instance in which the non-priority line can send the priority line into bypass mode is when DRS is enabled on the non-priority line. Whenever DRS is enabled on the non-priority line, both lines have equal priority. Since DRS is used for routing, the instant ringing occurs, when DRS is enabled, routing is assumed and the alternate line is immediately locked out. Thus, DRS should normally be used only on the priority line, line two 9.

Another feature of this invention is the ability to transfer specific tones detected upon an incoming telephone line to a specific port. Any one tone can be designated for a specific port. Thus, if the incoming telephone line contained fax tones (1100 Hz) the switch could be programmed such that the fax tone was routed only to the fax port. The fax tones would not be routed to the TAD, phone or modem ports. Thus, the device can be programmed so that each port only receives predesignated tones.

The present multi-line switch device can also be programmed to allow Caller ID (CID) information to pass through to the phone port in all modes. Remote Message Notification (RMN) can also be selected. When RMN is enabled, upon receipt of a TAD message, incoming fax or modem connection the switch device will dial a preprogrammed telephone number and emit a series of beeps repeated every three seconds for one minute. The beeps indicate to the called person what activity has occurred; one beep can indicate a TAD message, two beeps a fax message, three beeps a TAD and a fax message, four beeps a modem message, five beeps a TAD and modem message, six beeps a fax and modem message. Thus, the called person will know what type of message(s) the device has received and connected. The called person or user can then change the connection by using DTMF transfer tones to retrieve TAD messages or enter remote programming mode.

This switch device can be programmed using DTMF entry. It will enter programming mode upon entering "#*" on the handset attached to the phone port. Program entries are saved in nonvolatile memory (NVRAM). Remote programming can also occur by DTMF entry on the calling line after a security access code has been entered.

In addition, an inbound call can be transferred to any port by entering a port assignment code via DTMF entry. After the appropriate port assignment code is entered the switch connects the inbound call to the termination circuitry, sends busy signals to the transferring port, and rings the transferred port. If the transferred port does not answer within the allotted number of rings, the inbound call is terminated. Thus, the invention allows a caller to route calls to specific ports, effectively bypassing the automatic switching features of the invention.

FIG. 4 is a diagram illustrating the switching operation of this invention. First, the processor performs a start up sequence 100, 102. This sequence is mode dependent. For example, if line two was the priority line and configured for active mode, the processor would configure the bypass and invert relays, and other components appropriately. The power up sequence determines the desired configuration based upon programmable instructions stored in the NVRAM. After the power up sequence is complete, the processor begins waiting for incoming telephone calls upon either line 104. If neither line is ringing, the processor next checks whether any port is off hook 106. Assuming neither port is off hook nor a line is ringing, the processor will continuously loop through these two checks until either a line rings or a port is taken off hook.

The first scenario to be examined is when neither line is ringing and the operator desires to send a fax, make a modem connection, or make an outgoing call on line two. The processor in performing its continuous looping check 104–106, detects a port off hook 106. Immediately the line select relay is set to line 2 108 and the processor via software locks out all responses to a line one ringing 110 (the connection is automatically set to line two because in the normal two line configuration the non-priority line, line one, is directly connected via the invert relay to the incoming telephone line and is not routed through the routing switch). This effectively connects the desired port through the routing switch to line two. At this point the processor has proceeded through blocks 104–106–108–110–112.

Upon reaching decision block 112 the processor looks for DTMF tones. These tones would occur if either party desired to change the configuration or operation of the present device. Assuming no DTMF tones are present the processor then awaits port hangup 114. The processor at this point will loop through blocks 112–114 until either DTMF tones are detected or the port hangs up. Upon hang up the processor returns to start 100, resets the configuration of all switches and software algorithms and once again awaits an incoming call.

Assume the calling or called party enters DTMF tones, these would be detected by the processor in block 112. Next, the processor would start "phantom" ringing at the DTMF transferred port 146. For example, if a distant party was called via phone on line two, and at the end of their conversation the distant party needed to send a fax, the call could be transferred to the fax port by either party entering the correct DTMF transfer code, and the fax could be sent without having to reestablish telephone connectivity. Once the DTMF code is entered and the "phantom" ring begins 146, the processor counts the number of rings 148. If the desired port does not answer 152 and the predetermined number of rings has been reached, the processor terminates the call 150 and starts processing again 100. If the ringing port answers 152 the processor returns to block 112 and awaits either additional DTMF tones or for the call to be hung up 114. Thus, after sending the fax, either party could reestablish voice connectivity by again entering the correct DTMF code.

The second scenario is when line one is ringing. Once again the processor awaits detection of a line ringing signal 104. Next it checks to see if the ringing line is the priority line 116 (in this case assume line two is the priority line).

Since the priority line is not ringing the non-priority line (line one) is checked 120. Since line one is ringing, the line select relay is set to line one 122. This will allow the processor to listen in on the call for the presence of DTMF or CNG tones after it has been answered by an operator. The processor does not actively answer line one. Next, the processor looks to see if any phone has answered the incoming call 126. If not, the processor returns to block 116 and checks whether a call is incoming on the priority line, line two 116. The checking of line one and return to checking of line two (i.e. blocks 116–120–122–126) is continued until either a call is detected on line two, line one is answered, or line one ringing has stopped 124.

Once line one is answered (and there is no call on line two) the processor in block 128 initiates a predetermined count down clock during which time period the processor will listen for the presence of CNG tones on line one. First, the processor looks for CNG tones 130, next it looks for DTMF tones 132. Assuming neither is present, the processor checks whether the line was hung up 136. Next, it checks once again whether line two (the priority line) is ringing 138. Assuming none of these has occurred, the processor checks the count down clock to see if time has expired 134. If time has expired, CNG transfers can not occur, only DTMF transfers will be available. The processor continues this loop of checking for CNG/DTMF tones until the non-priority line is hung up, line two receives a call, or tones are present. If tones are detected the processor sets the bypass relay 142 thereby connecting line two to only the telephone extension and locks out monitoring of line two 144 until the call is terminated. Once tones are detected on either line, the processor initiates phantom ringing of the desired port 146 and continues ringing until the ring count has expired 148 or the call is answered 152.

Once a call is detected on the priority line, line two, 116 the line select relay is automatically set to line two 118 and monitoring of line one is locked out 140 until the line two call is terminated 150, or the port has answered 152 and subsequently hung up 114. Upon termination of a priority line call the process returns to start 100.

OPERATION

The following is an operational sequence of the multi-line switch according to the present invention. After a power up sequence is complete, the processor awaits detection of incoming calls upon line one or line two by the ring detectors. Once a ring is detected upon either line, the processor checks whether the incoming call is upon the priority line, in this example line two. If line one had been configured as the priority line, the processor would have checked for incoming calls upon it first. If a call is detected upon the priority line, the processor ceases monitoring the non-priority line for incoming calls until the call on the priority line has been processed. If the call was not on the priority line and was instead on the non-priority line, the processor awaits human answering of the call upon a telephone extension, while continuing monitoring of the priority line for incoming calls. After the line is answered the processor then listens for a predetermined time period for CNG tones. If tones are present, the processor configures the bypass relay such that the priority line is directly connected to the 2-line phone port, while connecting the incoming call upon the non-priority line to the desired telecommunications device as indicated by the CNG tone. While awaiting the detection of CNG tones upon the answered non-priority line, the processor continues to monitor the priority line for incoming calls. Thus, in its recommended operating configuration, at any time before the detection of CNG tones upon the non-priority line, the processor can direct the invention to connect calls upon the priority line before connecting calls upon the non-priority line.

Although a reliable multi-line telephone switch device has been shown and described in this application, it should be understood this invention is not to be limited to the exact form disclosed, and changes in detail and construction of the invention may be made without departing from the spirit thereof.

What is claimed is:

1. A multi-line telephone switch device which automatically switches incoming calls on a plurality of incoming telephone lines to a plurality of connected telecommunication devices based upon predetermined incoming signals, said multi-line telephone switch device comprising:
   a) a multi-line telephone switch means;
   b) a telephone line inlet connection means for connecting said multi-line telephone switch means to a plurality of incoming telephone lines;
   c) a telecommunication device connection means for connecting one or more telecommunication devices to said multi-line telephone switch means;
   d) an electrical power means for providing power as needed for said multi-line telephone switch means;
   e) said multi-line telephone switch means includes a line switching means which senses the presence of an incoming telephone call upon each of said plurality of telecommunication lines and routes said incoming call to the appropriate connected telephone communication device; and
   f) said multi-line telephone switching means further includes a
      1) a ring detection means for determining upon which of said incoming telephone lines a ringing signal is present and providing an output signal indicative thereof;
      2) line selection means for selecting one of a plurality of incoming telephone lines for routing to one of a plurality of telecommunication devices;
      3) switching bypass means for automatically routing an incoming telephone call to a preselected device without first selecting the telephone line upon which said incoming telephone call is being sent;
      4) telephone line inverting means for inverting the priority of call processing upon two incoming telephone lines;
      5) a line monitoring means for monitoring an incoming telephone call upon a telephone line selected by said line selection means;
      6) a device selection means for selecting a particular device for connection to an incoming telephone line selected by said line selection means based upon signal detection by said line monitoring means;
      7) processing means for receiving input and programming instructions from said line monitoring means and ring detection means, and providing outputs to such devices as necessary for operation of said multi-line telephone switch;
      8) ringing means which upon initiation by said processing means generates ring signals to a telephone extension, and/or busy tones to the calling party; and
      9) off-hook detection means for determining when any one of a plurality of telecommunications devices are off-hook and providing an output indicative thereof.

2. The multi-line telephone switch device of claim 1 wherein said telecommunication device connection means includes a multi-line telephone outlet port for connection to a multi-line communication device.

3. The multi-line telephone switch device of claim 1 wherein said ring detection means is an electronic circuit which recognizes standard distinctive rings upon said incoming telephone lines and provides an output signal indicative thereof.

4. The multi-line telephone switch device of claim 1 wherein said line selection means is a relay which selects one of the incoming telephone lines for connection to said plurality of telecommunication devices.

5. The multi-line telephone switch device of claim 1 wherein said line selection means connects one of said incoming telephone lines to said line monitoring means.

6. The multi-line telephone switch of claim 1 wherein said switching bypass means consists of a relay having first and second poles which when said relay is energized said first pole connects said preselected telecommunication device to one of said plurality of incoming telephone lines, thereby bypassing said line selection means, and when said relay is de-energized said second pole connects one of said incoming telephone lines via said line selection means to one of said plurality of telecommunication devices selected by said device selection means.

7. The multi-line telephone switch device of claim 1 wherein said inverting means consists of a relay which when in its normal position connects said preselected telecommunication device to one of said plurality of incoming telephone lines and when said relay is switched to a second position connects said one of said incoming telephone lines via said line selection means to one of said plurality of telecommunication devices selected by said device selection means.

8. The multi-line telephone switch device of claim 1 wherein said line switching means further comprises:

a) a signal degradation prevention means which prevents degradation of a signal on an incoming telephone line selected for monitoring by said line switching means;

b) an amplification means for amplifying the signal produced by said signal degradation prevention means and providing an amplified output signal;

c) a line busy detection means which detects when the incoming telephone line selected by said line selection means is connected to an incoming call and sends an output signal indicative thereof to said processing means; and d) a signal transforming means for transforming said amplified output signal into a signal suitable for processing by said processing means.

9. The multi-line telephone switch device of claim 1 wherein said signal degradation means is a high impedance device placed in series after said line selection means such that said high impedance device reduces the current drawn from said selected incoming telephone line.

10. The multi-line telephone switch device of claim 1 wherein said device selection means is a series of relays connected to a common output of said line selection means such that energizing any one relay as determined by said processing means connects the line selected by said line selection means to a predetermined telecommunication device.

11. The multi-line telephone switch device of claim 1 wherein said processing means includes a data storage means for storing instructions and programs utilized by said processing means.

* * * * *